(12) United States Patent
Dworatzek

(10) Patent No.: US 8,308,835 B2
(45) Date of Patent: Nov. 13, 2012

(54) CYLINDRICAL FILTER ELEMENT

(75) Inventor: Klemens Dworatzek, Edingen (DE)

(73) Assignee: Mann+Hummel GmbH, Ludwigsburg (DE)

( * ) Notice: Subject to any disclaimer, the term of this patent is extended or adjusted under 35 U.S.C. 154(b) by 611 days.

(21) Appl. No.: 12/375,986

(22) PCT Filed: Jul. 20, 2007

(86) PCT No.: PCT/EP2007/057497
§ 371 (c)(1),
(2), (4) Date: Jan. 13, 2010

(87) PCT Pub. No.: WO2008/015109
PCT Pub. Date: Feb. 7, 2008

(65) Prior Publication Data
US 2010/0126125 A1 May 27, 2010

(30) Foreign Application Priority Data
Aug. 3, 2006 (DE) .................. 20 2006 011 993 U

(51) Int. Cl.
*B01D 46/00* (2006.01)
(52) U.S. Cl. .............. 55/498; 55/502; 55/510; 210/437; 210/457; 210/493.2; 210/497.01
(58) Field of Classification Search .............. 55/498, 55/502, 510; 210/437, 440, 443, 444, 457, 210/493.2, 497.01
See application file for complete search history.

(56) References Cited

U.S. PATENT DOCUMENTS

| | | | | |
|---|---|---|---|---|
| 5,211,846 A | * | 5/1993 | Kott et al. | 210/232 |
| 5,443,721 A | * | 8/1995 | Kelada et al. | 210/232 |
| 7,033,502 B2 | * | 4/2006 | Engelhard et al. | 210/497.01 |
| 2005/0035053 A1 | | 2/2005 | Engelhard | |

FOREIGN PATENT DOCUMENTS

| | | |
|---|---|---|
| DE | 10354315 | 8/2004 |
| DE | 10354315 A1 * | 8/2004 |
| WO | WO2004080568 | 9/2004 |
| WO | WO 2004080568 A1 * | 9/2004 |
| WO | WO2006010987 | 2/2006 |
| WO | WO 2006010987 A1 * | 2/2006 |

OTHER PUBLICATIONS

English translation of the International Preliminary Report on Patentability for PCT/EP2007/057497, issued Feb. 17, 2009.*

* cited by examiner

*Primary Examiner* — Robert Clemente
(74) *Attorney, Agent, or Firm* — James Hasselbeck

(57) ABSTRACT

To be able to achieve better compensation for length changes in a cylindrical filter element (100) having a cylindrical filter bellows (11) which is closed off at each of its end faces (1, 2) with an end disk (20), the filter bellows (11) which encloses a central tube (12) and an end disk (20) which serves as fixed bearing and is fixed relative to the central tube (12) or is connected with this is provided, as is a second end disk (20) is configured as movable bearing, with at least the second end disk (20) having an annular shape and being connected via an internal radial ring seal (22) to the central tube (12).

7 Claims, 6 Drawing Sheets

CYLINDRICAL FILTER ELEMENT

CROSS REFERENCE TO RELATED APPLICATIONS

This application is US National Stage Entry of international patent application no. PCT/EP2007/057497, filed Jul. 20, 2007 designating the United States of America, the entire disclosure of which is incorporated herein by reference. Priority is claimed based on Federal Republic of Germany patent application no. 202006011993.0, filed Aug. 3, 2006.

TECHNICAL FIELD

The invention concerns a cylindrical filter element comprising a tubular cylindrical bellows that is closed off at its end faces by a terminal disk, respectively.

PRIOR ART

Flow through such filter elements is in radial direction, in particular inflow from the exterior, so that the dirt-laden air is filtered on the filter bellows and the filtered air flows out into the interior of the cylindrical filter bellows. The terminal disks serve for guiding the air as well as for stabilization and seal-tight connection relative to a filter housing into which the filter element can be inserted. At least one of the terminal disks is of an annular shape in order to enable the filtered air to exit the interior of the cylindrical tubular bellows.

For manufacturing the filter bellows, paper materials are still preferred because of the excellent processability, the comparatively minimal costs, and the excellent filtering action. They have however naturally the disadvantage that the fiber geometry of the cellulose-containing fibers changes when exposed to moisture. Especially the length change is a problem in a filter element because special measures must be taken in order to be able to arrange filter elements, that can have different lengths due to weather conditions, at all times in a seal-tight way in a housing. For this reason, annular seals of a soft polyurethane foam, for example, are provided on the terminal disks which seals are compressible by a large travel and enable tolerance compensation but entail additional costs and, depending on the weather-caused length of the filter element, are loaded at different pressure between fixed clamping locations in the housing so that no reproducible seal-tightness of the filter element relative to the housing can be achieved.

It is thus an object of the invention to improve a filter element of the aforementioned kind in such a way that length changes of the filter bellows can be compensated in a better way.

SUMMARY OF THE INVENTION

This object is solved for a filter element comprising a cylindrical tubular bellows that at its end faces is closed off by a terminal disk, respectively, in that the filter bellows surrounds a central tube and in that a terminal disk serving as a fixed bearing is provided that is fixedly connected to the central tube and in that a second terminal disk is embodied as a floating bearing wherein at least the second terminal disk is embodied to have a ring shape and, by means of an inwardly positioned radial seal, contacts the central tube.

In this way, the second terminal disk can move along the central tube and vice versa when length changes of the filter bellows occur, wherein by means of the interposed annular seal there is always a sealing action ensured relative to the outer circumference of the central tube. The central tube forms the inner air passage and can be connected fixedly at least at one point to the housing. By means of the central tube loading of the filter element by tractive forces is possible also.

The first terminal disk can be formed as an integral part of the central tube or can be connected fixedly thereto in other ways, for example, by a snap-on connection.

In a preferred embodiment it is provided that an outer area of the terminal disk is connected with an inner annular area that surrounds the central tube by means of several radially arranged spoke-like webs wherein the intermediate space that is bridged by the webs is covered by an elastic sealing compound so that an axial seal is formed at the first terminal disk by means of which the filter element can be sealed e.g. relative to the bottom of the filter housing.

It is furthermore possible to provide on the second terminal disk that is acting as a floating bearing as well as on the first terminal disk a radial seal between the inner edge of the annular terminal disk and the central tube.

Especially preferred is an embodiment in which the adhesive for connecting the end face of the filter bellows to the terminal disk is in the form of an elastomer material that covers the back side of the terminal disk and projects outwardly at an annular opening of the terminal disk so that at the annular opening an annular seal is provided at the same time.

It is particularly advantageous that terminal disks of the same configuration can be employed: on the floating bearing a section of the central tube passes through the cutout in the terminal disk and is sealed thereat by means of an annular seal that rests against the central tube within the central cutout. On the fixed bearing the same terminal disk is used. In this connection, the radial annular seal can also be provided for sealing relative to a wall area of the central tube.

Since in the latter case with two radial seals the central tube still would have to be sealed relative to the filter housing, in most cases it is better to provide on the same terminal disk an axial seal and in this way connect the filter element on the fixed bearing fixedly and seal-tightly to the filter housing, in particular, the housing bottom.

BRIEF DESCRIPTION OF THE DRAWINGS

Further embodiments of the invention are disclosed in the further dependent claims and will be explained in more detail in the following with reference to the drawings. The drawings show in detail in:

EMBODIMENT(S) OF THE INVENTION

Figure 1:
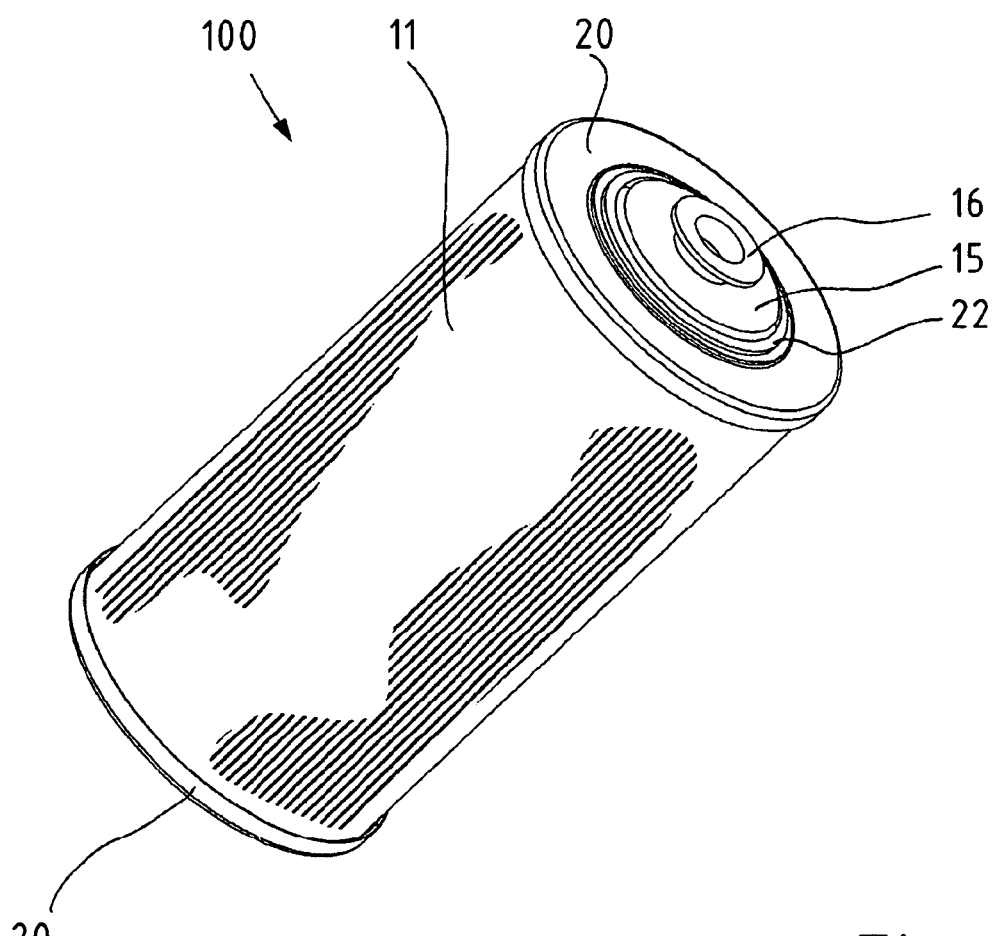
FIG. 1 a filter element in a perspective view.

FIG. 1 shows a filter unit 100 in a completely mounted form. A cylindrical tubular filter bellows 11 is closed off at its end faces by annular terminal disks 20, respectively. In the head area 1 a cap 15 of a central tube is arranged in the interior of the filter bellows and projects from the inner cutout of the terminal disk wherein the intermediately positioned gap is sealed off by a radially acting annular seal 22.

Figure 2:
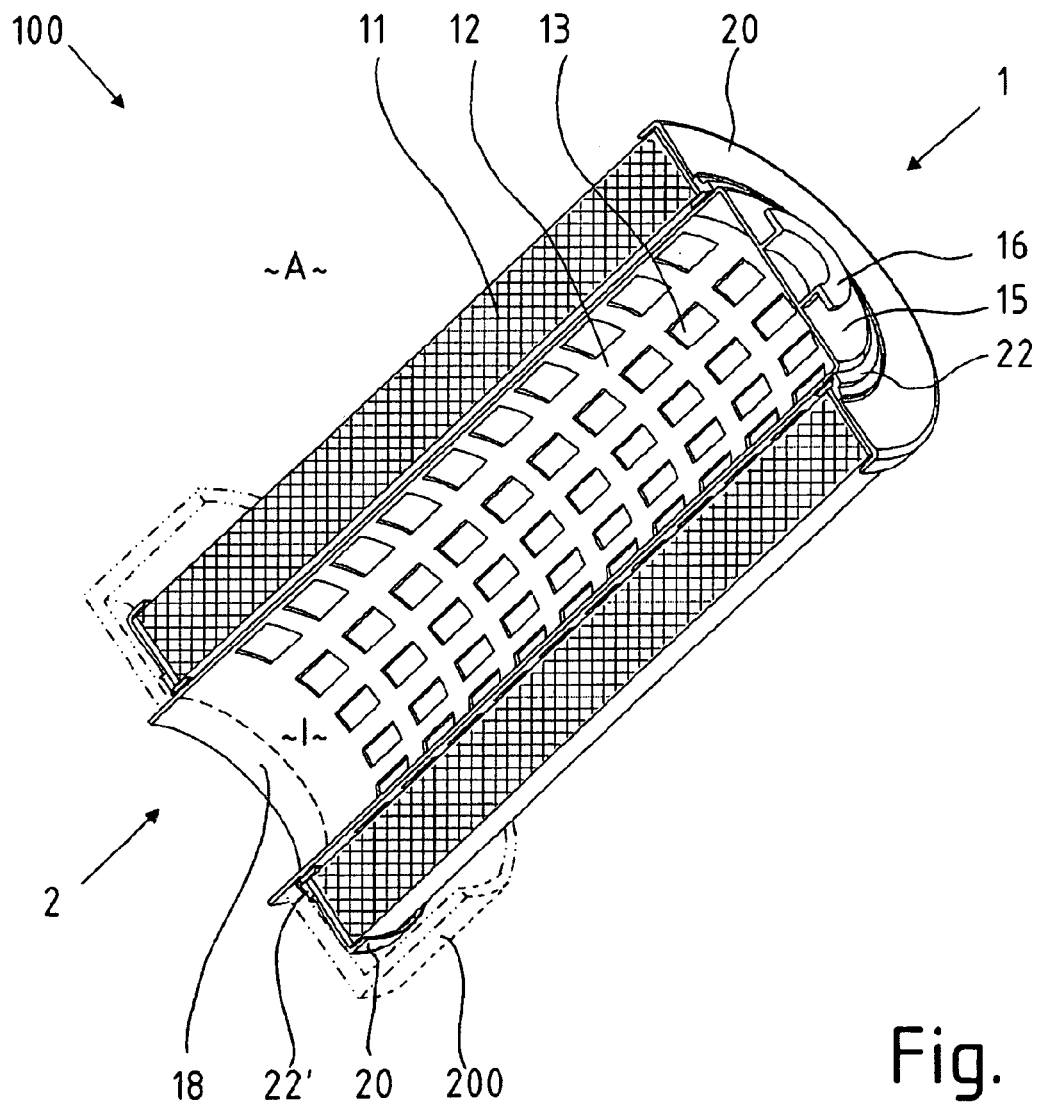
FIG. 2 a filter element in a perspective longitudinal section view.

FIG. 2 shows the filter element 100 in section wherein also the central tube 12 can be seen that passes through the interior of the filter bellows 11 and has penetrations 13 in order to enable radial air flow from the exterior A to the interior I.

In the head area 1 the central tube 12 is provided with a cap 15 that seals off completely the free flow cross-section. A projection 16 is integrally formed thereat in order to be able to grip by hand the filter element 100 for servicing purposes and in order to be able to effect a positive-locking action within a filter housing that enables however axial movability at the same time.

In the oppositely arranged foot area 2 the annular terminal disk 20 surrounds a projection 18 of the central tube 12. The interior I is open in order to enable the filtered air to flow out.

An annular seal 22' on the terminal disk 20 is pressed axially into a suitable annular surface in filter housing 200 in order to prevent leakage from the exterior side A of the filter into the interior side I of the filter. At this location a fixed bearing is formed where the filter element 100 is fixedly connected to the filter housing 200, with the annular seal 22' being axially pressed.

In the head area 1, on the other hand, on the cap 15 of the central tube 12 only a radial sealing action is effected in order to prevent that air can flow from the exterior into the gap between the cap 15 and the filter bellows 11.

The rigid central tube 12 that is used as a tie anchor and is in particular configured as a plastic part can carry out, in comparison to the surrounding filter bellows 11, various length changes. When a relative movement occurs between the filter bellows 11 with the terminal disk 20 glued thereto and the cap 15 of the central tube 12 as a result of different length changes, the circumferential area of the cap 15 can pass axially through the seal 22 without this causing damage of the filter element 100, such as e.g. the seal being torn off or the like.

Figure 3:
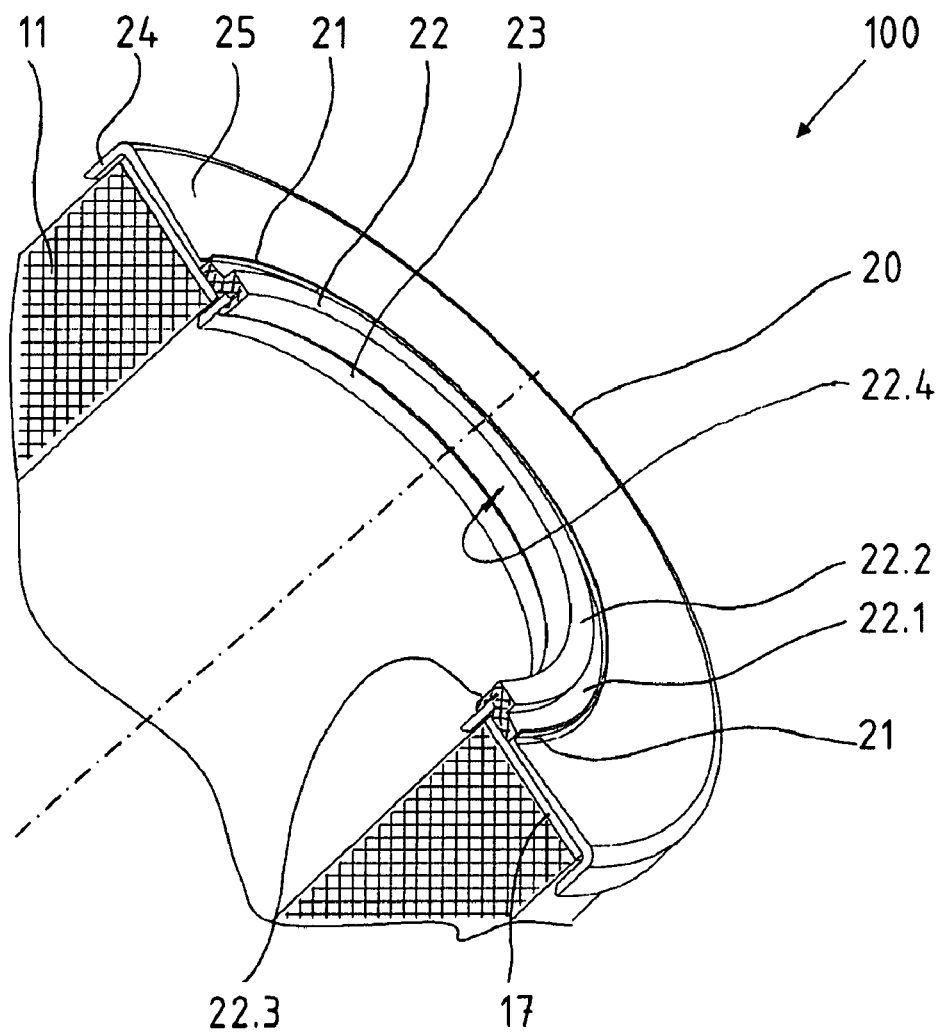
FIG. 3 a detail of the head area of the filter element according to FIG. 1.

FIG. 3 shows the head area with the radially acting seal 22 on the terminal disk 20 in detail. For improved illustration the central tube is not illustrated here.

On its end face in the head area the filter bellows 11 is fixedly connected by means of an adhesive layer 17 to the annular terminal disk 20. The terminal disk 20 has a projecting rim 24 that externally covers the circumferential area near edge of the filter bellows 11 and provides edge protection. A substantially smooth closed annular surface 25 adjoins it and is connected to a web 21 that forms the outer boundary for the seal 22. In the inward direction the terminal disk 20 is closed off by annular area 23 wherein the area 25 and the area 23 are connected to one another by radial webs that are covered by the annular seal 22 and are therefore not visible in the instant illustration.

On the annular seal 22 an area 22.1 extends from the web 21 inwardly and simply bridges without having special sealing function the gap between the areas 23, 25. A raised cross-sectional area 22.2 serves for covering the upper edge of the annular area 23. From here the raised area 22.2 passes into a sealing lip 22.3 that at least partially covers the annular area 23. By means of sealing lip 22.3 and the raised area 22.2 a cylindrical sealing surface 22.4 is provided within which the central tube 12 is slidably enclosed.

Figure 4:
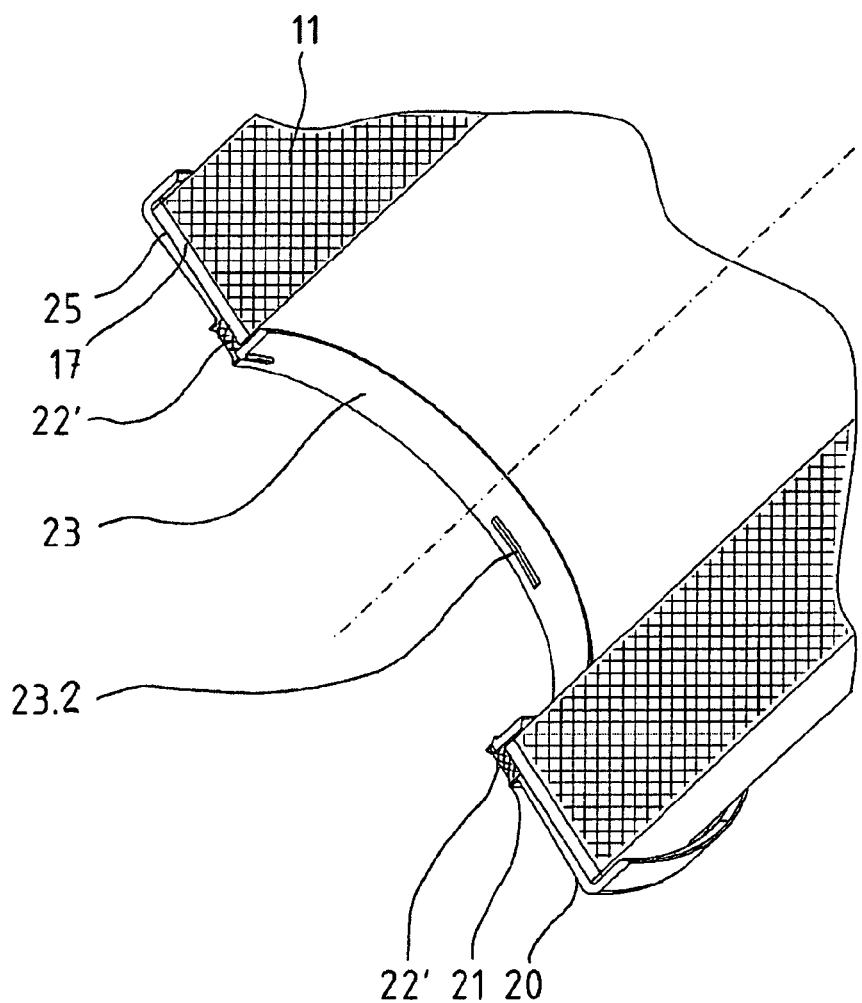
FIG. 4 a detail of the foot area of the filter element according to FIG. 1.

FIG. 4 shows the foot area 2 of the filter element 100 serving as a fixed bearing. A further terminal disk 20 closes off the filter bellows 11. The difference in comparison to the head area is only that the cross-sectional area between the annular area 23 in the web 21 is filled with a sealing compound in order to form an axially acting annular seal 22. As indicated by the locking ribs 23.2, the central tube 12 can be fixedly locked in order to secure its relative position relative to the filter bellows 11, including terminal disk 20 and seal 22', and in this way form a fixed bearing.

Figure 5:
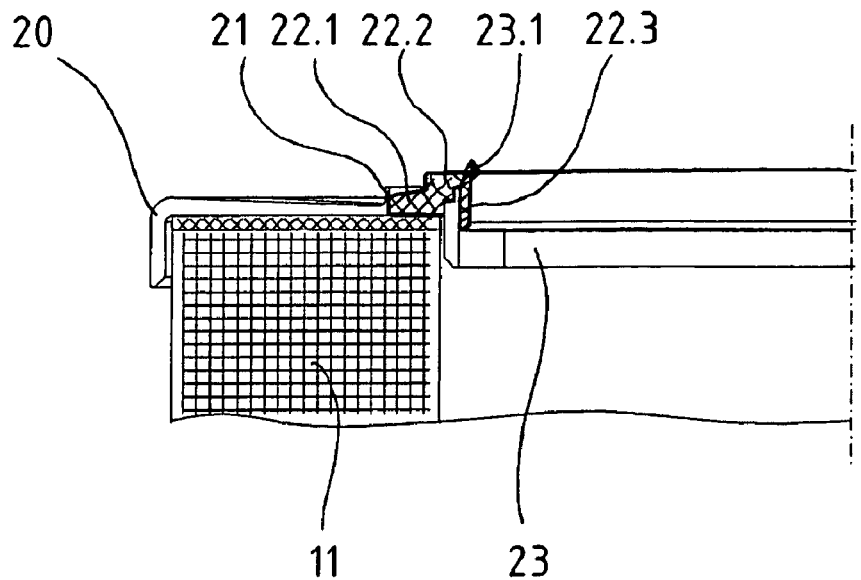
FIG. 5 a sectioned detail view of the head area.
Figure 6:
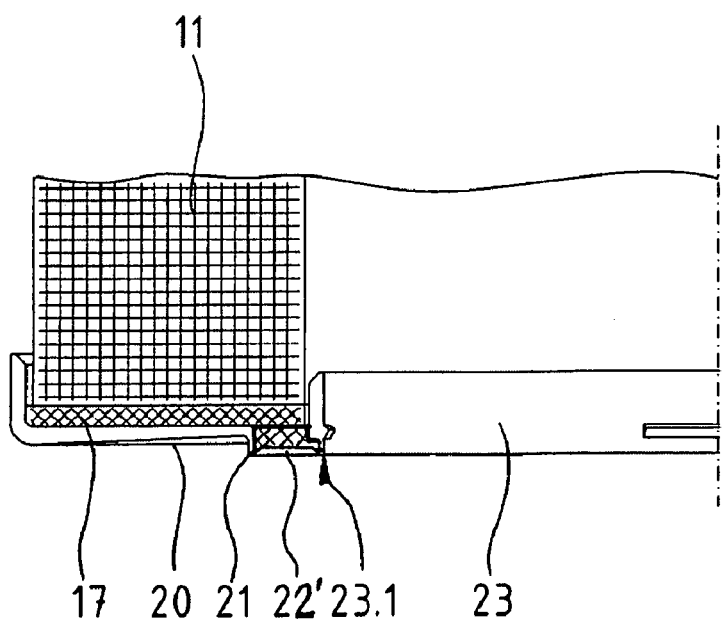
FIG. 6 a sectioned detail view of the foot area.

In particular by means of the illustration of FIGS. 5 and 6 a special advantage of a preferred embodiment of the present invention becomes evident: the fixed and floating bearings can be embodied by terminal disks 20 of the same configuration, the difference being that different seals 22 or 22' are attached or integrally formed thereat.

FIG. 5 shows, in cross-section of the head area 1, the seal 22 with the flat area 22.1, the raised area 22.2, and the adjoining sealing lip 22.3 that covers radially inwardly the inner annular area 23 of the terminal disk 20.

FIG. 6 shows the same terminal disk 20 in reverse position in the foot area 2. While the terminal disk 20 is essentially unchanged relative to the terminal disk in the head area 1, the sealing compound 22' in this case fills the area between the webs 21 and 23.1 but does not cover the web 23.1 acting as upper edge of the annular area 23.

Figure 7:
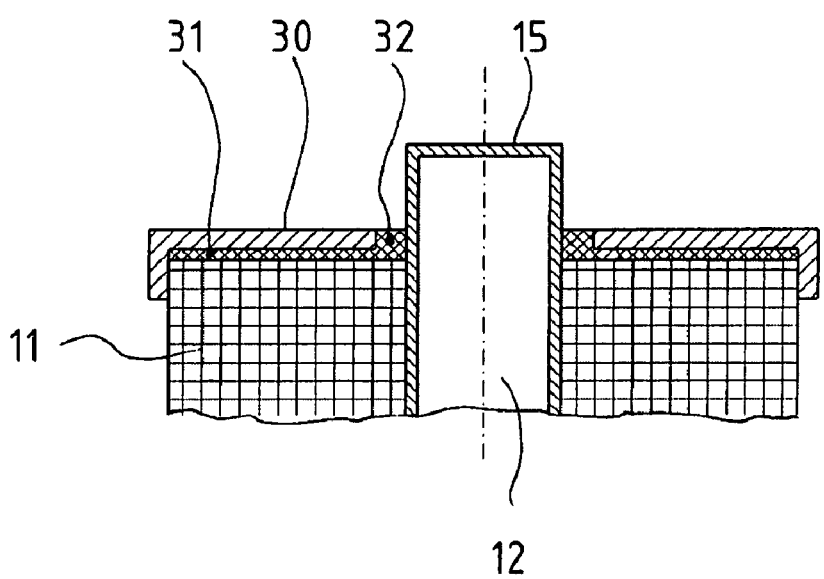
FIG. 7 a variant of the filter element.

FIG. 7 shows a variant of a filter element in which a terminal disk 30 of a simple design is provided whose inner cutout is that much greater relative to the inserted central tube 12 that an annular seal 32 is to be formed therebetween. The annular seal 32 is integrally formed with an adhesive layer 31 that connects the filter bellows 11 to the bottom side of the terminal disk 30. The adhesive layer 31 and the annular seal 32 are thus comprised of the same elastomer material and are produced in particular by casting a cross-linkable polymer composition in a casting mold. In the foot area the same terminal disk 30 with the same adhesive and sealing profiled areas 31, 32 is to be used. This embodiment therefore has two radially acting seals.

The invention claimed is:

1. A cylindrical filter element (100), comprising:
    a central tube (12) having wall penetrations (13);
    a cylindrical tubular bellows (11) having axially opposing end faces (1, 2),
    wherein said filter bellows (11) surrounds said central tube (12);
    terminal disks (20, 30) respectively closing off said end opposing end faces (1, 2) of said tubular bellows;
    wherein one of said terminal disks (20, 30) is a fixed terminal disk secured fixed positionally relative to the central tube (12), secured thereto and configured to serve as a fixed bearing, and
    wherein a second one of said terminal disks (20, 30) is a floating terminal disk configured as a floating bearing axially moveable on and along said central tube and having an annular shape provided with an inwardly positioned radial annular seal (22, 32) contacting the central tube (12),
    wherein said floating terminal disk does not engage into a wall of said central tube limiting said movement on said central tube,
    wherein said fixed terminal disk and said floating terminal disk are of the same configuration but differing in that different seals are attached or formed therat.

2. Cylindrical filter element (100) according to claim 1, wherein
    the terminal disk (20) at the fixed bearing is formed integrally with the central tube (12).

3. Cylindrical filter element (100) according to claim 1, wherein
    the terminal disk (20) at the fixed bearing is connected by a snap-on or locking connection (23.2) to the central tube (12).

4. Cylindrical filter element (100) according to one of the claims 1 to 3, wherein an outer area (25) of a least one of the terminal disks (20) is connected with an inner annular area (23) that surrounds the central tube (12) by several radially arranged webs wherein the intermediate space that is bridged by the webs is covered by an annular seal (22, 22').

5. Cylindrical filter element (100) according to claim 1, wherein
at least one of the terminal disks (20) comprises annular seal (22') that covers with at least one profiled section (22.3) an inwardly positioned boundary edge (23.1) and that extends up to the inner cutout of the terminal disk (20).

6. Cylindrical filter element (100) according to claim 1, wherein
the terminal disks have at least two concentric boundary edges (21, 23.1) wherein the terminal disk (20) serving as the fixed bearing has an axially loadable annular seal (22') that is inserted or integrally formed between the concentric boundary edges (21, 23.1) of the terminal disk and wherein a terminal disk (20) serving as the fixed bearing has an annular seal (22') that covers with at least one profiled section (22.3) an inwardly positioned boundary edge (23.1) and extends up to the inner cutout of the terminal disk (20).

7. Cylindrical filter element (100) according to claim 1, wherein
at least one of the terminal disks (30) is connected by an elastomer adhesive layer (31) to an end face of the filter bellows (11), and
wherein the elastomer adhesive layer (31) passes into an annular seal (32) that covers an annular gap between an inner edge of the terminal disk (30) and the outer wall of the central tube (12).

* * * * *